United States Patent
Eichel et al.

(10) Patent No.: US 6,266,437 B1
(45) Date of Patent: Jul. 24, 2001

(54) SEQUENTIAL DETECTION OF WEB DEFECTS

(75) Inventors: Paul H. Eichel, Albuquerque; Gerard E. Sleefe, Cedar Crest; K. Terry Stalker; Amy A. Yee, both of Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/148,391

(22) Filed: Sep. 4, 1998

(51) Int. Cl.[7] ....................................................... G06K 9/00
(52) U.S. Cl. .......................... 382/149; 382/141; 382/306; 348/88; 348/125; 356/430
(58) Field of Search ................................. 382/141, 145, 382/149, 276, 306, 287; 250/306, 305, 310, 372, 370.1, 396 R, 559.08, 559.46, 492.2; 348/88, 126, 125; 356/429, 430, 337, 237

(56) References Cited

U.S. PATENT DOCUMENTS

| | | | |
|---|---|---|---|
| 4,173,441 | * | 11/1979 | Wolf ................................. 250/559.49 |
| 5,118,195 | * | 6/1992 | Dobbie ............................ 250/559.46 |
| 5,138,667 | * | 8/1992 | Roch et al. ........................... 382/112 |
| 5,249,139 | * | 9/1993 | Blasius et al. ........................ 382/112 |
| 5,305,392 | * | 4/1994 | Longest, Jr. et al. .................... 382/8 |
| 5,365,596 | * | 11/1994 | Dante et al. .............................. 382/8 |
| 5,608,639 | * | 3/1997 | Twardowski et al. ................ 364/478 |
| 5,642,198 | * | 6/1997 | Long .................................... 356/239 |
| 6,024,018 | * | 2/2000 | Darel et al. .......................... 101/365 |
| 6,043,909 | * | 3/2000 | Holub .................................. 358/504 |
| 6,108,436 | * | 8/2000 | Jansen et al. ........................ 382/112 |

OTHER PUBLICATIONS

Yu Xiaohsan et al., On–line control of the colour printing quality by image processing , IEEE Tencon 93. p. 1039–1041 vol. 2 Oct. 19–21, 1993.*

* cited by examiner

*Primary Examiner*—Matthew C. Bella
*Assistant Examiner*—Sheela Chawan
(74) *Attorney, Agent, or Firm*—George H. Libman

(57) ABSTRACT

A system for detecting defects on a moving web having a sequential series of identical frames uses an imaging device to form a real-time camera image of a frame and a comparitor to comparing elements of the camera image with corresponding elements of an image of an exemplar frame. The comparator provides an acceptable indication if the pair of elements are determined to be statistically identical; and a defective indication if the pair of elements are determined to be statistically not identical. If the pair of elements is neither acceptable nor defective, the comparitor recursively compares the element of said exemplar frame with corresponding elements of other frames on said web until one of the acceptable or defective indications occur.

21 Claims, 4 Drawing Sheets

SEQUENTIAL DETECTION OF WEB DEFECTS

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

There are many web-based color patterning processes in use today. Such systems typically include a continuous web of manufactured material (e.g. paper, textiles, linoleum) that passes through a printing press which imparts colored designs and patterns to the material using various dyes or inks. These designs are typically manufactured as a series of adjacent frames on the material, with each frame containing the printed pattern. One common printing press for such processes utilizes a plurality of cylindrical screens that rotate in contact with the material. Ink or dye is squeezed through the screen onto the material at predetermined times and locations to apply a pattern to the material that is repeated with each rotation of the screen. Ink jet printers that directly spray the colors onto the moving web may also be used.

Three categories of defects may occur during this printing process. First, "the right color in the wrong place" means the color is applied at incorrect locations on the material. This problem may be global and occur over the entire surface of material, or it may be local to a portion of each frame. Second, "the wrong color in the right place" means there is a problem with the dye delivery. The color may have insufficient coverage (scabby), be of an incorrect formulation (off shade), be applied too thickly (mottled), or be not printed (missing). These defects are frequently global, although stickins (a miscellaneous splotch of color) are local. Third, material defects, including seam marks, scrimps, print resist, butterflies, glue streaks, crooked cloth, and bias printing, also result in global or local defects.

Recently, interest has been growing in the use of computer-based inspection systems to monitor, in real time, the print process to provide timely information about the overall print quality, the presence of print defects that would require immediate remedial action, and an electronic "rollmap" of an entire batch of printed material. Such systems could significantly enhance the value added in a color print process by improving quality control, reducing waste, and allowing automated inventory management.

The technical requirements of such a system are ambitious. Many color patterning processes utilize very high web speeds and widths. The spatial detail of printed patterns demand very high resolution imaging systems. These two requirements imply very high raw sensor data rates. Camera and computer system capabilities are just recently achieving the level of performance to permit such realtime inspection.

U.S. Pat. No. 5,301,129 of S. McKaughan et al discloses a system for inspecting the surface of a moving web of homogeneous material using a camera to receive light reflected from the web. A series of multi-dimensional convolution filters transform the output of the camera to eliminate background information while enhancing the features of anomalies. The patent does not disclose application of this system to a patterned web.

U.S. Pat. No. 5,533,145 of F. Shofner et al discloses a system for detecting fiber-size defects in textile webs using light reflected from the web and computer processing. This patent does not disclose web pattern detection.

Statutory Invention Registration No. H1616 of K. Wolfe, dated Dec. 3, 1996, discloses a web inspection system having enhanced video preprocessing of an image captured by a line scan CCD camera. This system does not disclose comparing successive frames of a web.

U.S. Pat. No. 5,696,591 of R. Bilborn et al discloses a system that measures light intensity transmitted through a web and triggers a fault when the received intensity differs from a profile. The image is digitized and processed in real time.

SUMMARY OF THE INVENTION

It is an object of this invention to provide an on-line defect detection system for web-based repeated color patterns.

It is another object of this invention to provide a defect detection system using a personal or standard work-station computer (having an industry-standard bus-based architechure) and sequential detection software to compare printed material with a production standard, rather than expensive special purpose image processing hardware.

Additional objects, advantages, and novel features of the invention will become apparent to those skilled in the art upon examination of the following description or may be learned by practice of the invention. The objects and advantages of the invention may be realized and attained as particularly pointed out in the appended claims.

To achieve the foregoing and other objects, and in accordance with the purpose of the present invention, as embodied and broadly described herein, the present invention may comprise a system for detecting defects on a moving web having a sequential series of identical frames including imaging means for forming a real-time image of a frame and a comparitor for comparing elements of an exemplar frame with corresponding elements of a real-time image from said imaging means. The comparitor uses sequential detection on each pair of elements to provide an acceptable indication if the pair of elements are determined to be statistically identical and a defective indication if the pair of elements are determined to be statistically not identical. The comparitor further provides a look-again indication if the pair of elements are determined to be neither acceptable nor defective. In this event, the comparitor recursively compares the element of the exemplar frame with corresponding elements of other frames on the web until either an acceptable or defective indication occurs.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
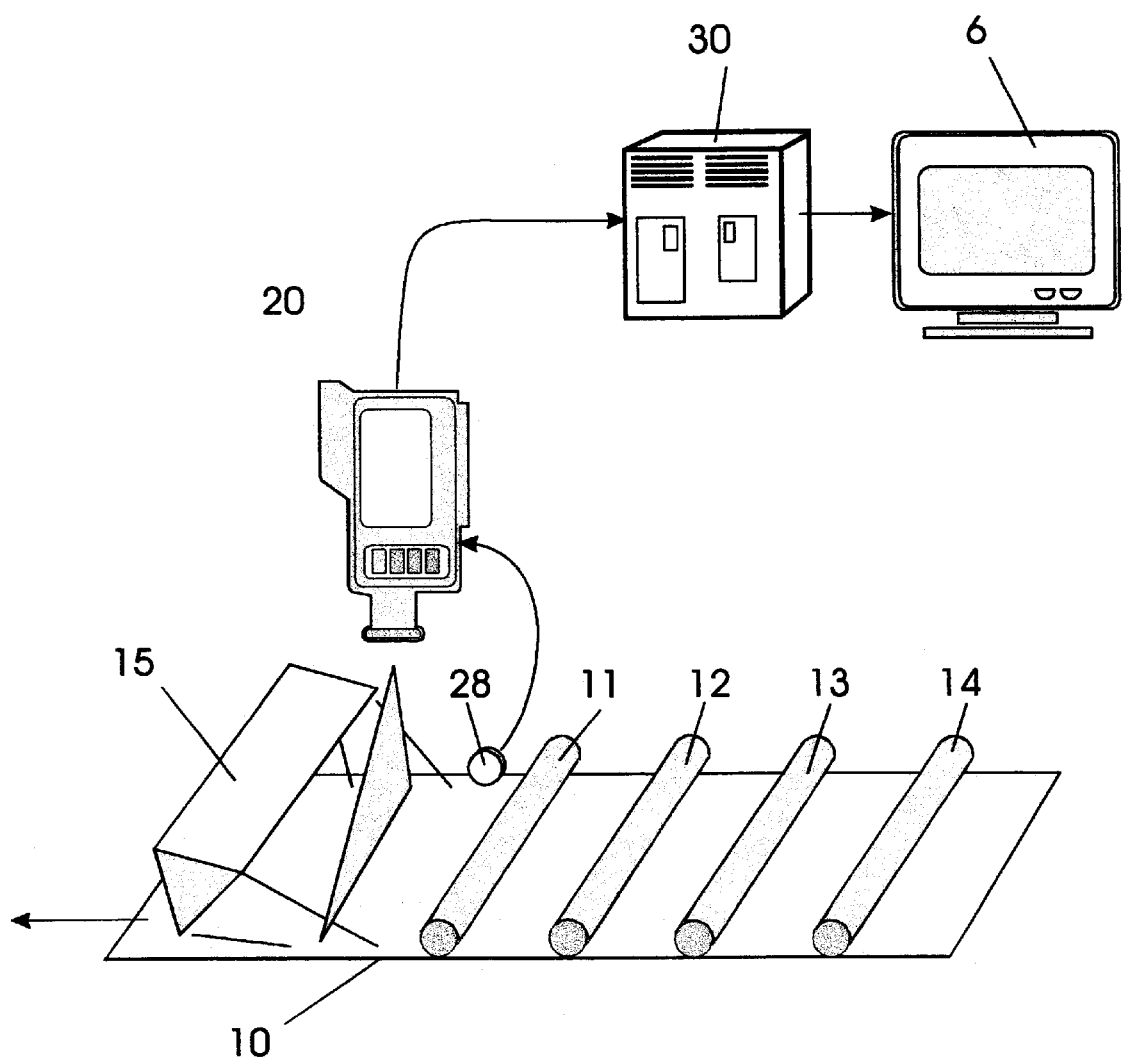
FIG. 1 shows a block diagram of the system of this invention.

A block diagram of a preferred embodiment of the color pattern inspection system is shown in FIG. 1. The system is installed directly on a printing range where a web 10 such as cloth or linoleum or any other sequentially-printed patterned object moves past a printer having a series of rotating print screens 11–14 where different colors are imprinted on web 10. A transverse area of web 10 is illuminated by lighting system 15 and scanned by a sensor 20. The output of sensor 20 is processed in computer 30, as discussed hereinafter, and an output is provided on display 60.

A preferred sensor 20 for this system is a 2048 element color line scan camera which scans about 27 inches across web 10 and uses the motion of the web itself to build up a two-dimensional image of the work. An encoder wheel 28, riding on the surface of web 10, generates a fixed number of pulses per linear inch, synchronizing the line rate of the camera 20 with web speed. The data issuing from the camera are red, green, and blue spectrally weighted samples. For a typical textile application, the data rate is:

$$R = 36 \text{ inches/sec} * 75 \text{ lines/inch} * 2048 \text{ samples/line} * 3 \text{ bytes/sample} = 16.6 \text{ MB/sec}.$$

By spatial sampling at a rate of 75 elements/inch in each of the web directions, print features on the order of 0.5 mm in their smallest dimension may be resolved. This resolution corresponds to a sampling integration area of approximately 0.1 mm² per element in the object plane. Each element corresponds to a pixel of the image of camera 20.

Figure 2:
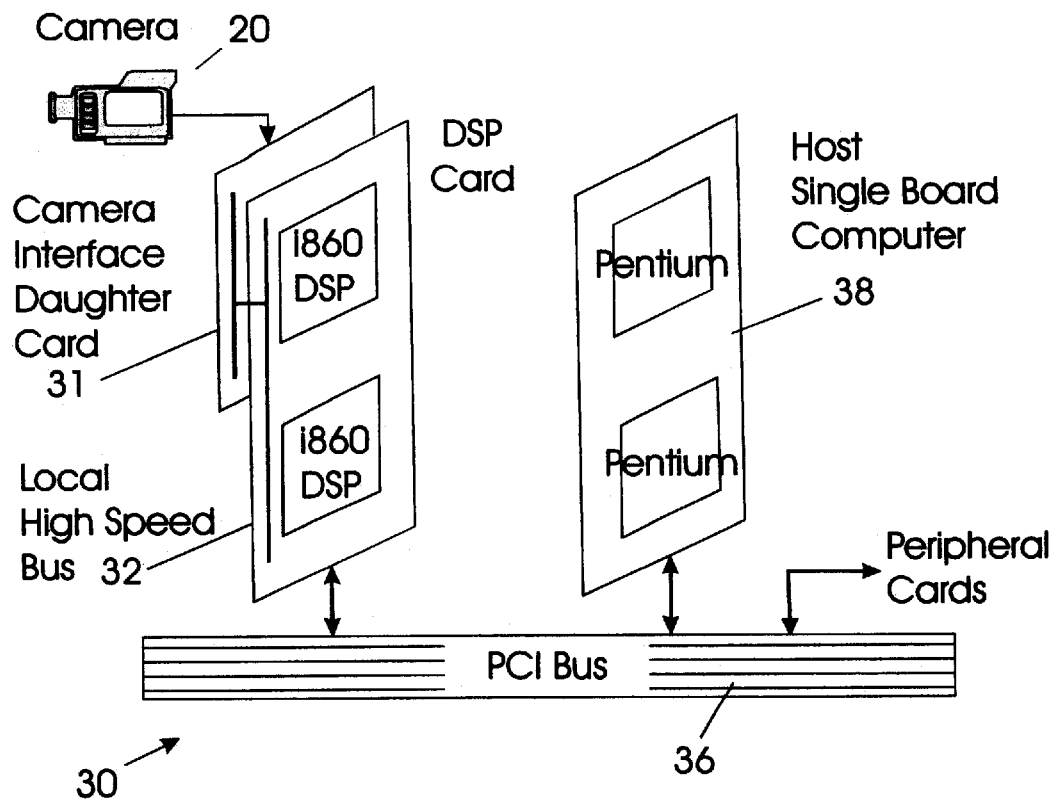
FIG. 2 shows a block diagram of the computer of the invention.

An example of an implementation of computer 30 is shown in FIG. 2 to utilize an industry standard dual Pentium™ main processor board 38 hosting a general purpose Digital Signal Processor (DSP) card 32 on a standard PCI bus 36. DSP card 32 contains two i860 DSP processors, a camera interface daughter card 31, (such as an Alacron DI-24 (Alacron Corporation, Nashua, N.H.)), and an SVGA graphics daughter card (not shown). The camera-rate processing functions of compensation, subimaging, statistical sampling, and subimage correlation (for warp computations), as discussed hereinafter, are simple to implement and involve only a few operations per pixel. Since they must function at the higher sensor data rates, they are performed on DSP card 32. The lower rate, sampled data is then uploaded via PCI bus 36 to the host Pentium board 38. There, the higher level functions of detection and classification are performed. The system is programmed in a standard high level language to facilitate software maintenance. Since the host employs industry standard processors and operating systems, integration of this system with existing plant local area networks is assured and straightforward.

Various conventional compensation processes are accomplished by a plug-in digital signal processing (DSP) board 32. For example, nonuniform lighting intensity as well as variations in the color temperature of the illuminator over the camera scan length are compensated for at this step by the computer. Also, color line scan cameras typically do not output the R-G-B color samples in registration due to the fact that the three color sensor arrays are not co-located in the focal plane of the camera. Board 32 delays two of the spectral color sample output lines to agree with the third.

The approach of this invention to defect detection is to employ an exemplar image and compare the real-time camera imagery to it. This type of model is not particularly compact and typically requires a significant amount of memory for storage. However it does capture a complete geometric and color representation of the print design under evaluation. Given such a model, the goal of the defect detection system is to compare the current camera image to the exemplar and identify areas of the former that differ significantly from the latter. The key words here are differ significantly. Minor differences are to be expected due to normal process variations in printing, camera noise, lighting variations, etc. These variations occur both in geometry and in color. The detection system must allow for these normal process variables and yet be able to detect true flaws when they occur.

There are several ways to generate an exemplar. Perhaps the simplest approach is to select a camera image of a "good, defect free" portion of web 10. It is readily available, easily interfaced to the system, and already in camera specific colors, i.e. color as the camera sees it. Alternatively, several defect free images of web 10 could be imaged and averaged. Another possibility is to build a composite image from the CAD separates, coloring each from a palette. This method produces a geometrically perfect exemplar, although the color palette may not accurately match the colors as they are subsequently imaged by the camera. The best attributes of these methods may also be combined so the invention synthesizes an exemplar image by using the CAD separations as masks to segment a camera image taken from the print range. Within each of the segments, the mean and variance of color samples for that separation are calculated to provide a camera specific palette of colors (as well as their variances). The exemplar is then constructed by the computer using the "perfect" geometries of the CAD files and the "camera" colors of the palette.

Although difficult to implement, such an exemplar model has a number of significant characteristics. The geometric precision of colored regions is equal to that of the CAD separation files. The palette colors care derived from the actual camera samples over each color region. Palette variances are also calculated from spatial averages over each color region from a single camera image. And the final data structure comprises one byte per pixel. This model also allows a color coordinate system other than RGB (such as CIELAB) to be used simply by converting the s element palette table rather than the large image itself.

Tonal print patterns, where a single screen can print a range of values in color space, are somewhat more complicated. For these, the camera image can be palettized using a standard color segmentation algorithm, but the number of palette colors, s will generally exceed the number of separations (or screens), r. In fact, palette sizes up to s=256 colors are generally needed, even though only r=16 or so screens are used. In this case, the palette means are provided by the color segmentor, but the palette variances are still calculated over each separation region. Thus there are s palette means but only r variances.

A brute force comparison of 16 MB of information from a fast-moving frame with 16 MB of information from the exemplar would have very expensive computing requirements. According, the invention utilizes a significant data rate reduction from the camera's 16 MB rate by a combination of statistical sampling and sub-imaging.

Registration

Figure 3:
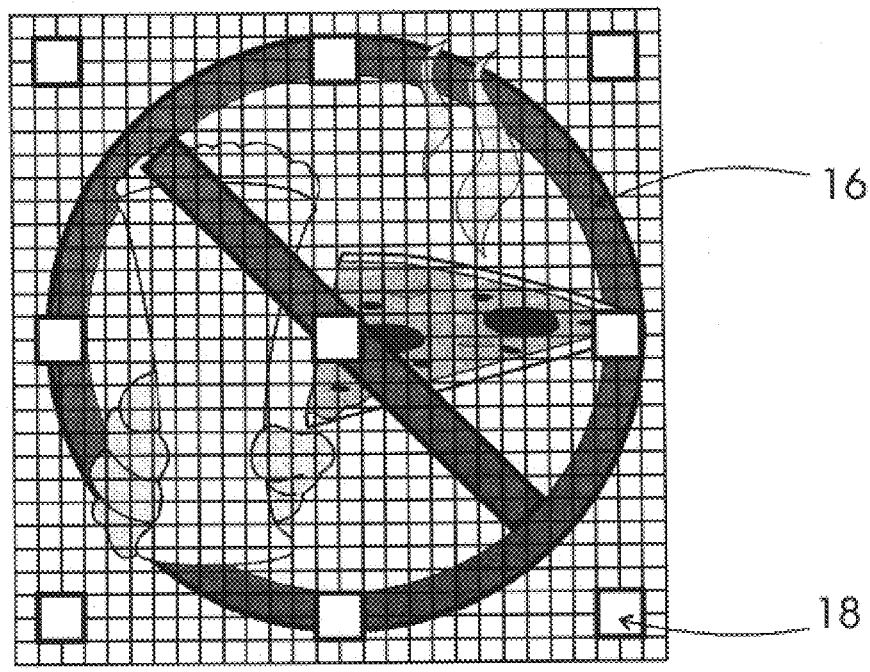
FIG. 3 shows pixels selected for warp correction on a typical image.

DSP board 32 produces a small number of full-resolution but limited coverage image chips 18, as shown in FIG. 3, which are used to register the frame and exemplar images.

Registration ensures that the samples of the image which are selected for comparison with the exemplar are matched only with corresponding samples of the exemplar. This image-to-image registration procedure must be very precise. Even with a camera pixel spot size of 0.1 mm² that is able to resolve features as small as 0.34 mm, the system will not work if image to exemplar misregistration is significantly larger than that. Worse, errors in registration could easily lead the detection algorithm into concluding that geometric errors exist for acceptable product as it would be comparing one position in the camera image with a different position in the exemplar image. Registration must be performed to an accuracy on the order of a pixel size.

The geometry of the printed pattern is governed by that of the print screens themselves, which, while perhaps being out of alignment with respect to each other, nevertheless impose a spatial correlation to their respective color's alignment. A given color separation, having been printed on the substrate by a roller screen, can be out of position by being too far advanced along the web direction, retarded along that direction, or too far to the left or right. It can even be crooked such that the left side is advanced and the right side retarded, etc. However, over the full extent of the image, the misalignment of this color is spatially correlated. It cannot be advanced in one location and immediately left in the adjacent location, because of the physical properties of the screen itself. Therefore, image registration may be accomplished by means of a low-order polynomial warp from one image to the other. In practice, experiments have demonstrated that a first order, 2-D polynomial warp is a sufficient model for this problem. This warp allows for displacement, rotation (although this should be slight), skew, and scale change (stretching or shrinking).

For warping functions that can be described by 2-D polynomials, it is sufficient to calculate local image-to-image displacement vectors at several points distributed throughout the image area and then find the best fit polynomial by linear regression. For a first order poly-nominal model, only four local displacement vectors (or control points) are required. It is, however, customary practice to calculate more than the minimum required and so produce an overdetermined set of equations for the regression analysis.

The only real differences in these types of registration methodologies is in how the control points are determined. The preferred embodiment uses the cross correlation method described by W. Pratt, "Correlation techniques of image registration", IEEE Transactions on AES, vol. AES-10, May 1974. Essentially, the method works by extracting chips or small areas from the two images, computing the 2-D Fourier transform of the chips, conjugate multiplying the transformed data, and inverse transforming. The position of the peak in the magnitude of this final array is a measure of the local displacement from one image chip to the other.

In practice, an image chip (a subimage of the entire image) is extracted from each of the camera image and exemplar image. Experiments have shown that 3×3 arrays of control points are a sufficient size for the subimage chips to calculate a reliable warp function. Since the 2-D FFT method of determining the cross correlation functions is being used, the subimage chips should be squares with dimensions equal to a power of 2. Experimental evidence again suggests that 128×128 chips work quite well. These considerations imply that very little of the full resolution camera image data is required to support these computations. Out of a 2048×2700 sample color image (27.3"×36" at 75 dpi), image registration needs only 9×128×128 green channel samples, or roughly 0.1% of the total image data. Thus, it is seen that this computationally efficient image registration methodology requires an input data rate 3 orders of magnitude lower than the raw camera rate.

FIG. 3 shows a representation of an image 16 that may be repeated along the web 10 of FIG. 1. Camera 20 divides image 16 into a plurality of pixels which are too small to illustrate but which are represented by the grid overlying image 16. Nine pixel chips, represented by white boxes 18, are sufficient to enable warp compensation as discussed above.

Figure 4:
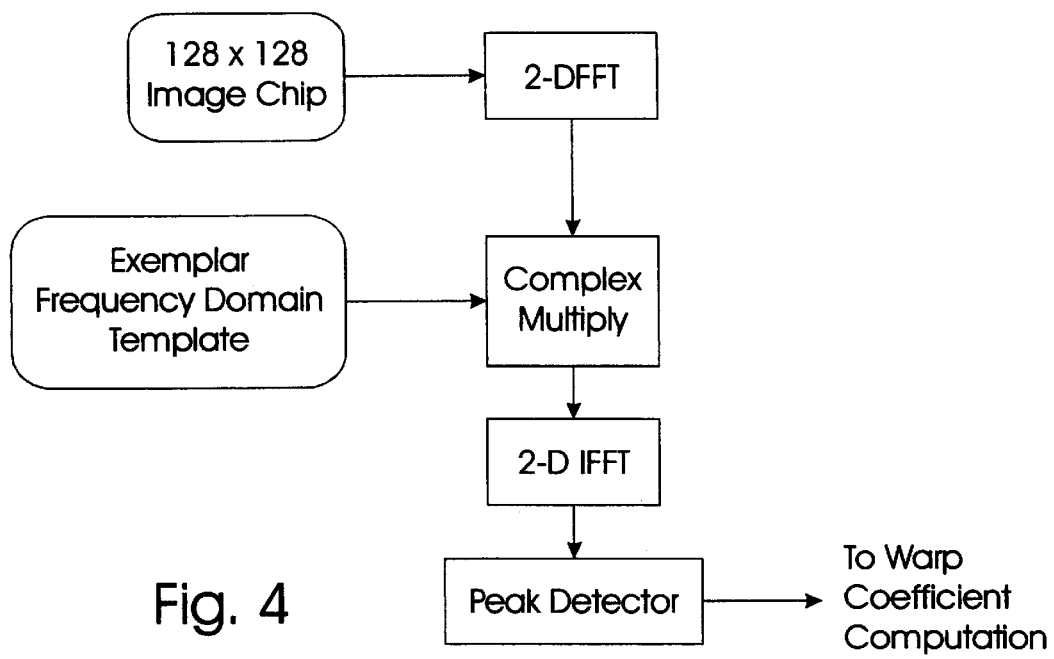
FIG. 4 shows image-to-exemplar registration methodology

As shown in FIG. 4, each subimage is Fourier transformed and conjugate multiplied. Because the data is real and non-negative, it has a nonzero mean. To avoid a bias in the cross correlation function, the dc coefficient of the conjugate multiplied array is set to zero and an inverse transform taken to obtain the cross correlation function and locate the peak value. The offset of these peaks is the estimate of local displacement.

The procedure is repeated on a number of subimage pairs from the nine chips to obtain a set of displacement vectors from which the warp function is calculated. Nearest neighbor interpolation is used with the warp function to determine each location in the camera image that corresponds to a desired location in the exemplar image. In this way, small dynamic variations in image geometry due to such process variables as substrate stretch or shrink, web speed changes, skew, and rotation can be accommodated.

Subsampling

The camera and exemplar images are compared after they are registered. An important element of this invention is the realization that an accurate comparison may be attained without sampling every pixel. Individuals with long standing experience in sampled data systems tend to equate sampling interval with spot size, insisting on meeting the Nyquist criteria for sample rate. However, this is only necessary when one is later required to recreate the original (continuous) signal from the samples. That is not the problem for this invention where there is no need to reproduce an image of the printed web. All this system is concerned with here is whether a given separation is being printed with the correct color and in the proper places. While a small spot size is required for this purpose, contiguous sampling is not.

For nearly every defect the system is to detect, a statistical sampling approach is quite sufficient. For a full resolution camera image of a 36' print repeat, the image will consist of 2048×2700=5.5 million pixels, each of which integrates the web over an 0.1 mm² area. Most defects affect many of these 5.5 million. For example, even a small (0.5 mm) misfit of a color separation occurs over perimeters of that color's print regions throughout the repeat. All that is required is to examine a statistically relevant number of these samples.

Figure 5:
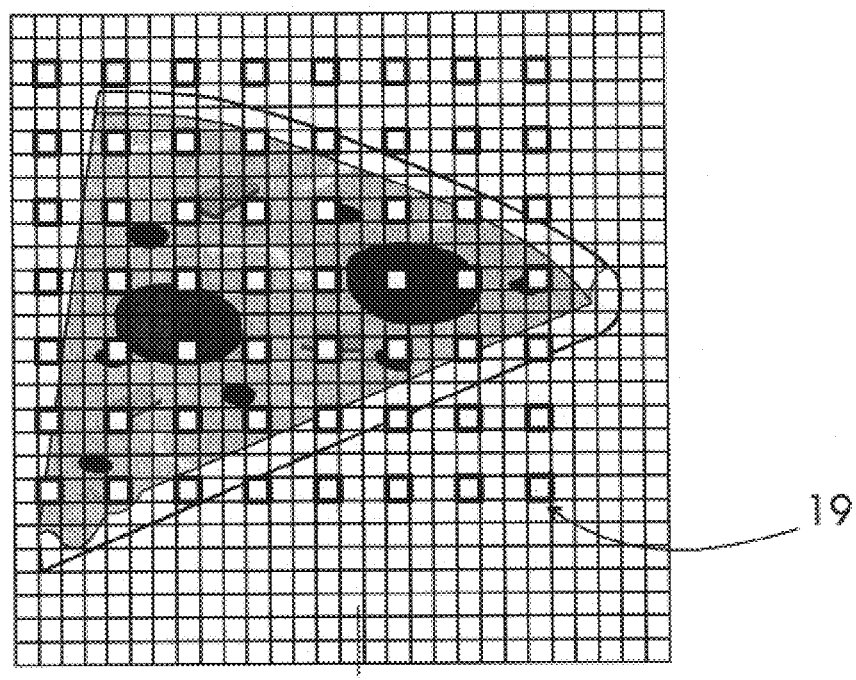
FIG. 5 shows pixels sampled for image comparison.

But how to select which pixels to process? Empirical evidence suggests that processing every third or fourth camera pixel in both directions is sufficient, depending on defect size tolerances. Such sampling is illustrated in FIG. 5 where a portion of the image 16 of FIG. 3 is sampled at every third pixel 19. In the test system, this results in sampling the web every millimeter or so in both directions, with a spot size of 0.1 mm². Such subsampling is an inexpensive processing step that reduces the data bandwidth at the outset by a factor of 9 or 16, from 16.6 Mb/sec. down to 1.8 or 1 Mb/sec.

It is important to distinguish subsampling the full size camera image from downsampling it. The latter, involving filtering the data followed by reduced rate sampling, is equivalent to using a camera and optical system with a larger spot size, since both result in averaging over a larger area in the object plane. Rather, the invention subsamples the camera data by discarding pixels so as to retain the desired spot size and arrive at the required area sampling rate.

Comparing

The subsampled, full area image data from the camera, having been registered with the exemplar image, is ready for the detection stage of the process. Defect detection is generically performed by comparing the subsampled elements (pixels) of the camera image with corresponding elements of the exemplar image and flagging those areas that are somehow "different". The goal of this stage of the processing is to divide the pixels of the camera image into two groups: normal pixels that agree acceptably with the exemplar, and defective pixels that do not.

Generally speaking, detection proceeds along the following lines. First the image data may be preprocessed. This step may include registration, color coordinate transformation, smoothing or edge enhancement, or other processing functions on one image independent of the other. Second, a change statistic or test statistic is calculated based on the registered data in both images. This is where the two images are compared. The test statistic should capture, in a quantitative way, the amount of difference between the two images at every location. This step is usually followed by some manner of decision processor. In this step, the test statistic for each pixel is compared to a threshold or otherwise tested to make a low-level decision as to whether that pixel is defective or not. This can be followed by a higher level process of grouping defective pixels, removing outliers, and the like. There are a fairly large number of possible variations on this general theme.

Figure 6:
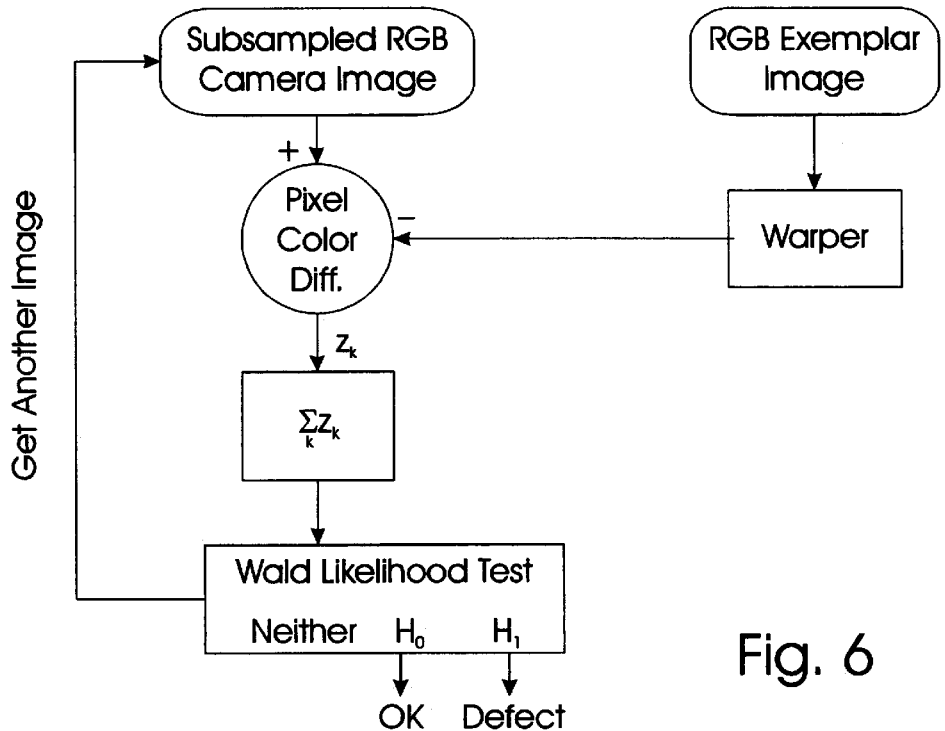
FIG. 6 shows a block diagram of sequential detection for image comparison.

As summarized in FIG. 6, the subsampled camera image data is directed to the host board 38 for sequential defect detection. For detection, individual camera pixels 19 are compared with their corresponding exemplar values. Any pixel that differs significantly from the exemplar value is flagged as a defect pixel. The difference is calculated using a distance metric in color space. Detection decisions are not made independently on each frame. Instead of making a binary decision (acceptable or defective) on each pixel within each frame, the detector has three output states: acceptable, defective, and "look again". The last state means that the next frame is collected and examined before a decision on the pixels which were neither acceptable or defective is again attempted. The process is recursive, self regulated, and reset individually for every pixel in the image. If a large color difference develops at a certain location, a defect decision can be reached immediately on that frame. More subtle defects may require the acquisition of several frames before a statistically reliable decision may be reached. The extra degree of freedom afforded by the tri-state output of a sequential detector allows the probabilities of false acceptance and false rejection to be selected independently. This is in contrast with binary decision detection schemes which can specify one or the other, but not both simultaneously.

Whether or not a given location is a defect is determined on the basis of statistical inference, a type of decision making based on probability. A statistical decision is required because absolute certainty can never be achieved due to the corruption of noise. Since virtually all of the defects which occur in web 10 are repetitive, multiple observations of a given defect may be made and used to advantage. The branch of detection theory that evolved to handle this situation is known as sequential detection. This branch of mathematical detection theory was first described by A. Wald, Sequential analysis, Wiley, 1947, and has been successfully applied to many difficult detection problems involving repetitive signals, primarily in radar and sonar. The application of this powerful technique to the color printed pattern defect detection problem is a key part of this invention. Rather than picking a probability of detection and having to live with the resulting false alarm rate dictated by the conditional probability functions, sequential detection allows a selection of both the false acceptance and false rejection probabilities. The conditional density functions then dictate how long or how many image frames are required to achieve that level of performance.

In anticipation of the development of the optimal sequential detector for the color print problem, a camera image model is developed which includes an index k to reference multiple image frames (or repeats to the printer). A noise model also specifies that the noise component random variables are independent from color channel to channel and also over the time index k. This is physically plausible, since camera noise is in no way synchronized to the repeat interval.

The Wald sequential test has two objectives. First, it must ensure the error probabilities satisfy the inequalities:

$$P\{\text{decide } H_1|H_0\} \leq \alpha_1 \qquad \text{eq. 1}$$

$$P\{\text{decide } H_0|H_1\} \leq \alpha_2 \qquad \text{eq. 2}$$

where $H_0$ is the hypothesis that the camera pixel is the same as the exemplar pixel and $H_1$ is the hypothesis that the camera pixel is different from the exemplar pixel. In words, equation 1 states that the probability of false rejection, the pixels are determined to be different ($H_1$) when the pixels are actually identical, is $\leq \alpha_1$. Equation 2 means the probability of false acceptance, the pixels are decided to be identical ($H_0$) when they are actually different, is $\leq \alpha_2$. The user defines each value of the error probabilities $\alpha$ in equations 1 and 2. As set forth below, these error probabilities are used to set thresholds based on $T_1$ to accept and based on $T_2$ to reject the pixels as being statistically identical.

Hypothesis $H_0$ is selected if the likelihood ratio (as discussed in *Detection, Estimation, and Modulation Theory*, by H. Van Trees, Wiley, 1968) is less than the threshold $T_1$, and $H_1$ is selected if the likelihood ratio is greater than $T_2$:

$$\Lambda(\bar{f}_r) \overset{H_0}{<} T_1 = \frac{\alpha_1}{1-\alpha_2} \qquad \text{eq. 3}$$

$$\Lambda(\bar{f}_r) \overset{H_1}{>} T_2 = \frac{1-\alpha_1}{\alpha_2}. \qquad \text{eq. 4}$$

For the second part of the Wald test, it may be shown from conditional density functions that the assumption is that there is no defect (condition $H_0$) if:

$$\left|\sum_k z_k\right| \overset{H_0}{<} \frac{\sigma_c^2}{e}\ln T_1 + \frac{ke}{2} \text{ and} \qquad \text{eq. 5}$$

Likewise, the assumption is that there is a defect (condition $H_1$) if:

$$\left|\sum_k z_k\right| \overset{H_1}{>} \frac{\sigma_c^2}{e} \ln T_2 + \frac{ke}{2}. \qquad \text{eq. 6}$$

where $\sigma^2$ is the noise variance, e is the maximum acceptable error contrast, and k is the number of observations. If the likelihood ratio falls between these two thresholds, the observations continue until one or the other inequality is met.

The left hand side of equations 5 and 6 is simply the sum of the differences between the observed pixels $f_g$ and the corresponding exemplar pixel g:

$$\sum_k z_k = \sum_k (f_k - g). \qquad \text{eq. 7}$$

The decision regions defined by the right hand sides of equations 5 and 6 are functions of the noise variance, the maximum acceptable error contrast, the performance constraints of equations 1 and 2, and the number of images k in the sequence.

Figure 7:
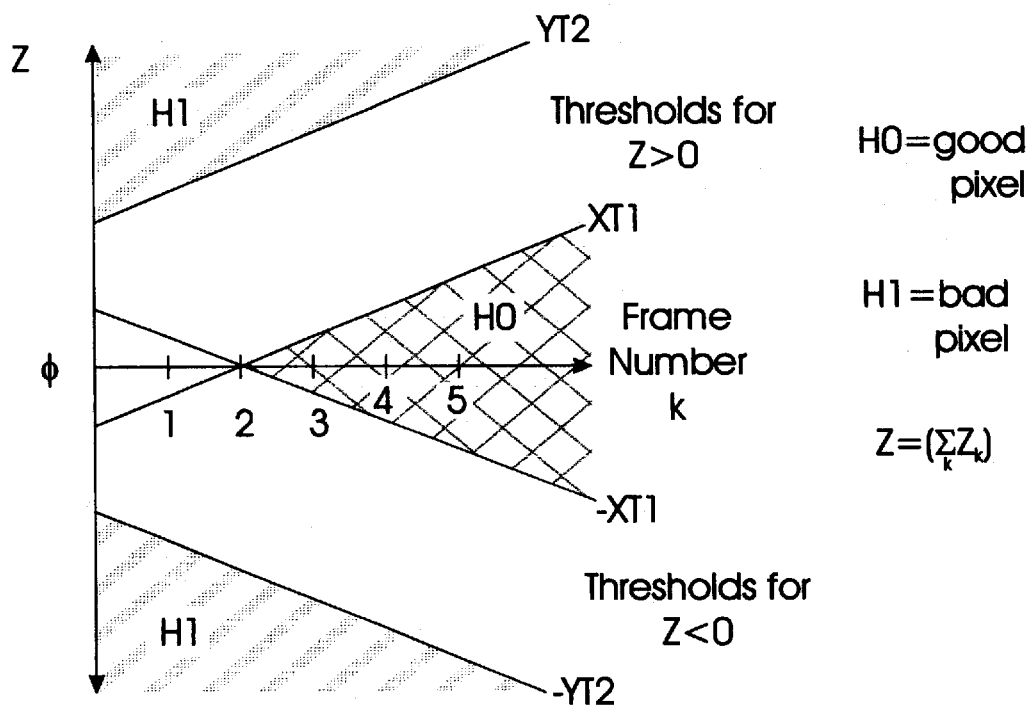
FIG. 7 shows a thresholds and decision regions for element comparisons.

Equations 5 and 6 may be represented graphically as shown in FIG. 7. Thresholds are denoted by a pair of parallel lines, $XT_1$, $YT_2$, that extend upwardly from the z axis and represent the right hand portions of equations 5 and 6 where z>0. A second pair of parallel lines, $-XT_1$, $-YT_2$, extend downwardly and represent the right hand portions of equations 5 and 6 where z<0. If equation 5 is satisfied, the summation of z is within shaded area between lines $XT_1$ and $-XT_1$. If equation 6 is satisfied, the summation of z is within shaded areas above $YT_2$ or below $-YT_2$.

As is apparent from FIG. 7, there will never be a "correct" determination based on examination of only one frame (k=1); however, if the difference between the first examined pixel and the exemplar pixel is too great, there may be a "defect" determination after the first frame. More subtle errors or noisier data require more looks before a decision is reached. This behavior is similar to human behavior. A printer may spot an obvious, high contrast defect upon its first occurrence. However, more subtle errors may require several repeats to be observed before the defect is ascertained.

A clearer understanding of this process may result from considering the physical implications of the process. Each successive measurement is a function of the observed intensity plus noise. If there is a difference between the observed intensity and the exemplar intensity, the absolute value of the sum of this difference (equation 7) will increase with successive frames, quickly raising the value of Z outside either lines $YT_2$ or $-YT_2$. However, if the difference is mainly caused by random factors such as noise, the summation of the difference will tend towards zero and place it within the cross-hatched area.

Note that the additional performance of this system results from the fact that the color pattern of the product as well as the defect generating mechanism repeats from frame to frame. This is the case for most continuous web printing processes. For the rare situation where the pattern does not repeat on a frame by frame basis, the sequential detector must (and can) be restricted to make binary decisions on every pixel. In this case, some loss of performance is to be expected.

Finally, the detected defect pixels are passed to the classifier stage. In this stage, the cause of the defect is ascertained. The position of the defect pixels relative to the whole pattern as well as the defect and exemplar pixel colors are used in this step. This information, in conjunction with CAD drawing files, allows the defect cause to be traced to the color separation number of the pattern. The CAD files map the locations of each of the color separates in the pattern. The color and position of the defect pixels can then be related to the individual color separations by means of a statistical voting system. Knowing the separation number of the defect is often sufficient to pinpoint the cause of the printing aberration on the range.

The particular sizes and equipment discussed above are cited merely to illustrate a particular embodiment of this invention. It is contemplated that the use of the invention may involve components having different sizes and shapes as long as the principle of utilizing sequential detection while comparing an image on a moving web to an exemplar, is followed. It is intended that the scope of the invention be defined by the claims appended hereto.

What is claimed is:

1. A system for detecting defects on a moving web having a sequential series of identical frames comprising:
    imaging means for forming a real-time image of a frame;
    comparison means for comparing elements of an exemplar frame with corresponding elements of a real-time image from said imaging means; said comparison means using sequential detection on each pair of elements to provide:
        an acceptable indication if the pair of elements are determined to be statistically identical; and
        a defective indication if the pair of elements are determined to be statistically not identical; and
        a look-again indication if the pair of elements is neither acceptable nor defective, said comparison means recursively comparing said element of said exemplar frame with corresponding elements of other frames on said web until one of said acceptable or defective indications occur.

2. The system of claim 1 wherein for each exemplar element said comparison means combines an error value between said element and corresponding image elements from other frames until a function of said error values becomes less than a first threshold to provide said acceptable indication or greater than a second threshold to provide said defective indication.

3. The system of claim 2 wherein the absolute value of each of said thresholds increases as a function of the number of images compared with the exemplar.

4. The system of claim 1 wherein said image is formed from a grid of closely spaced pixels, the elements of said image consisting of a subsample of noncontiguous spaced pixels.

5. The system of claim 4 wherein said system further including decision means for indicating a frame is defective if the number of defective pixels exceeds a predetermined number.

6. The system of claim 1 wherein said system further comprises registration means for registering said image frame to said exemplar.

7. The system of claim 6 wherein said image is formed from a grid of closely spaced pixels and consists of a first set consisting of a subsample of noncontiguous spaced pixels and a second set consisting of an array of subimage chips spaced over said image, each chip including substantially all pixels within a border, wherein the number of pixels within all subimage chips is much less than the number of pixels in the subsample; wherein said registration means utilizes only said subimage chips and said comparison means utilizes only said subsampled pixels.

8. The system of claim 7 wherein each subimage chip is square, the number of pixels on each side of said chip being approximately 5% of the number of pixels on the shortest side of said grid.

9. The system of claim 8 wherein there are 9 subimage chips spaced over said grid.

10. The system of claim 7 wherein said subsample consists of no more than every ninth pixel, said pixels being evenly distributed over said image.

11. A method for detecting defects on a moving web having a sequential series of identical frames comprising:

forming a real-time image of a frame;

comparing selected elements of an exemplar frame with corresponding elements of a real-time image using sequential detection on each pair of corresponding elements to provide:

an acceptable indication if the pair of elements are determined to be statistically identical; and a defective indication if the pair of elements are determined to be statistically not identical; and a look-again indication if the pair of elements is neither acceptable nor defective, and recursively comparing the selected elements of said exemplar frame with corresponding elements of other frames on said web until one of said acceptable or defective indications occurs.

12. The method of claim 11 wherein for each exemplar element said comparing step determines an error value between said element and corresponding image elements from other frames, and the recursive step adds the error values until they are either less than a first threshold to provide the acceptable indication or greater than a second threshold to provide the defective indication.

13. The method of claim 12 wherein the other frames in the recursive step are successive frames along the web.

14. The method of claim 11 wherein said image is formed from a grid of closely spaced pixels, the elements of said image consisting of a subsample of noncontiguous spaced pixels.

15. The method of claim 12 further including the step of indicating a frame is defective if the number of defective pixels exceeds a predetermined number.

16. The method of claim 11 further comprising the step of registering said image frame to said exemplar.

17. The method of claim 16 wherein said image is formed from a grid of closely spaced pixels and consists of a first set consisting of a subsample of noncontiguous spaced pixels and a second set consisting of an array of subimage chips spaced over said image, each chip including substantially all pixels within a border, wherein the number of pixels within all subimage chips is much less than the number of pixels in the subsample; and wherein said registering step utilizes only said subimage chips and said comparing step utilizes only said subsampled pixels.

18. The method of claim 17 wherein each subimage chip is square, the number of pixels on each side of said chip being approximately 5% of the number of pixels on the shortest side of said grid.

19. The method of claim 18 wherein there are 9 subimage chips spaced over said grid.

20. The method of claim 17 wherein said subsample consists of no more than every ninth pixel, said pixels being evenly distributed over said image.

21. The method of claim 11 wherein the real-time image is formed by a camera and the exemplar is constructed from a computer representation of an ideal image and color signals from the camera.

\* \* \* \* \*